(12) United States Patent
Goto

(10) Patent No.: US 12,084,587 B2
(45) Date of Patent: Sep. 10, 2024

(54) INK SET AND IMAGE FORMING METHOD

(71) Applicant: Konica Minolta, Inc., Tokyo (JP)

(72) Inventor: Masaki Goto, Tokyo (JP)

(73) Assignee: Konica Minolta, Inc., Tokyo (JP)

( * ) Notice: Subject to any disclaimer, the term of this patent is extended or adjusted under 35 U.S.C. 154(b) by 106 days.

(21) Appl. No.: 18/049,822

(22) Filed: Oct. 26, 2022

(65) Prior Publication Data
US 2023/0139162 A1 May 4, 2023

(30) Foreign Application Priority Data

Oct. 29, 2021 (JP) ................................. 2021-177869

(51) Int. Cl.
| | | |
|---|---|---|
| *C09D 11/40* | (2014.01) | |
| *C09D 11/102* | (2014.01) | |
| *C09D 11/106* | (2014.01) | |
| *C09D 11/107* | (2014.01) | |
| *C09D 11/322* | (2014.01) | |
| *C09D 11/326* | (2014.01) | |
| *C09D 11/328* | (2014.01) | |
| *C09D 11/38* | (2014.01) | |

(52) U.S. Cl.
CPC ............ *C09D 11/40* (2013.01); *C09D 11/102* (2013.01); *C09D 11/106* (2013.01); *C09D 11/107* (2013.01); *C09D 11/322* (2013.01); *C09D 11/326* (2013.01); *C09D 11/328* (2013.01); *C09D 11/38* (2013.01)

(58) Field of Classification Search
CPC ..... C09D 11/40; C09D 11/102; C09D 11/106; C09D 11/107; C09D 11/322; C09D 11/326; C09D 11/328; C09D 11/38
See application file for complete search history.

(56) References Cited

U.S. PATENT DOCUMENTS

2003/0069329 A1* 4/2003 Kubota ................ B41J 11/0015
523/160

FOREIGN PATENT DOCUMENTS

JP 2020050843 A * 4/2020 ............. C09D 11/40

* cited by examiner

*Primary Examiner* — Yaovi M Ameh
(74) *Attorney, Agent, or Firm* — LUCAS & MERCANTI, LLP

(57) ABSTRACT

An ink set includes four types of inks that are a yellow ink, a magenta ink, a cyan ink, and a black ink. Each of the four types of inks contains water and a colorant, and at least one of the four types of inks contains an ultraviolet absorber. When Abs (Y) represents the absorbance of the yellow ink, Abs (M) represents the absorbance of the magenta ink, Abs (C) represents the absorbance of the cyan ink, and Abs (K) represents the absorbance of the black ink with respect to light with a wavelength of 385 nm, the ratios of Abs (Y), Abs (M), and Abs (C) to Abs (K) satisfy predetermined conditions.

12 Claims, 1 Drawing Sheet

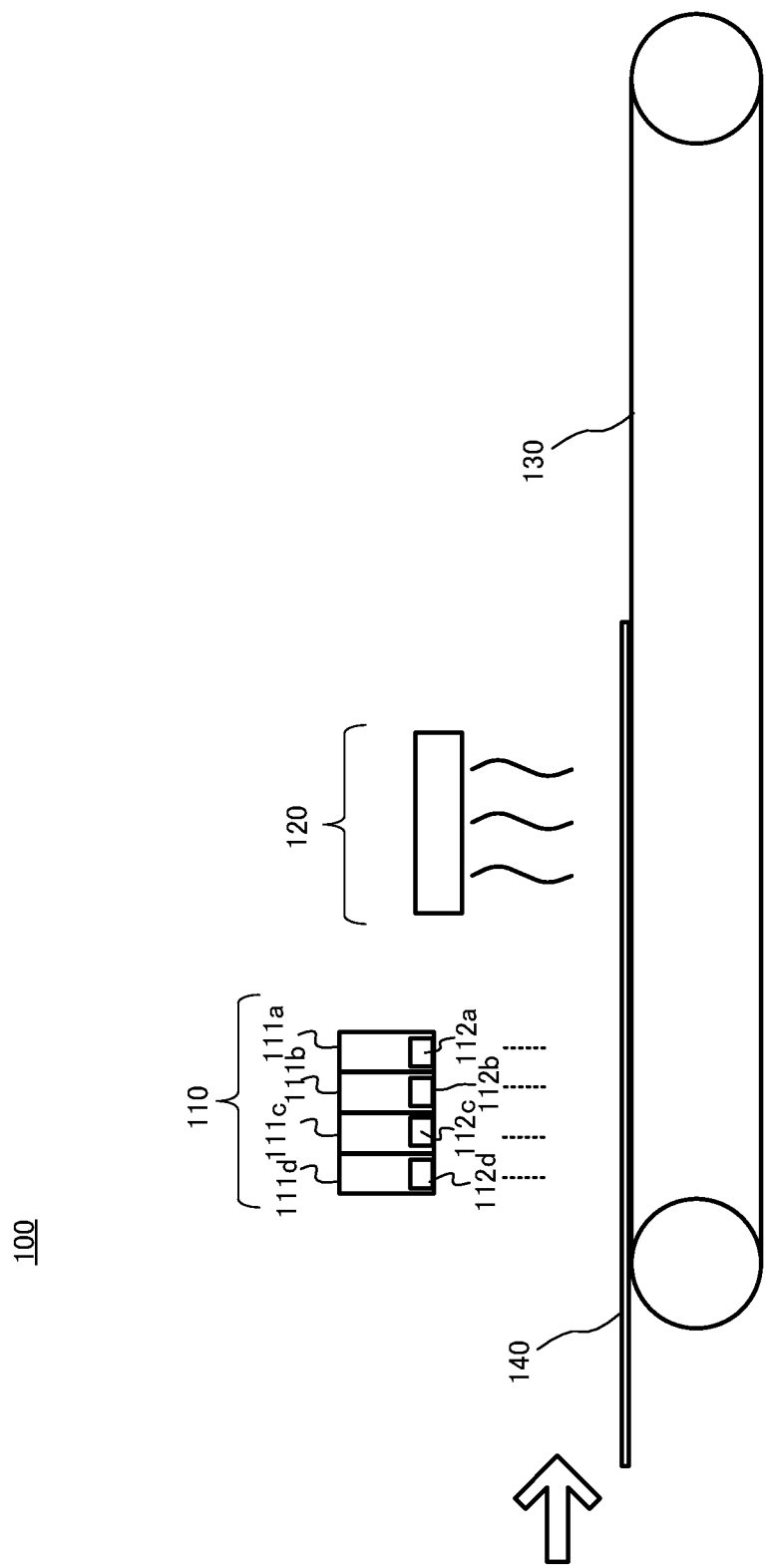

INK SET AND IMAGE FORMING METHOD

CROSS REFERENCE TO RELATED APPLICATIONS

The entire disclosure of Japanese Patent Application No. 2021-177869 filed on Oct. 29, 2021, is incorporated herein by reference in its entirety.

BACKGROUND

Technological Field

The present invention relates to an ink set and an image forming method.

Description of Related Art

An inkjet method, which enables digital printing without using plates, can form images easily and inexpensively, and thus is used in various printing fields.

There are several types of inks used in an inkjet method, such as a water based ink composed of water and a small amount of organic solvent, a non-water based ink containing organic solvent but substantially no water, a hot-melt ink that is solid at room temperature to be heated and melted for printing, and an actinic radiation-curable ink that is cured by irradiation with actinic radiation after the ink is printed. These inks are used according to the application. Among these, water based inks generally have little odor and are highly safe.

For full-color image forming techniques, such as the inkjet method, there is a demand for a printing technique that improves color reproducibility, which indicates the size of the color gamut of an image to be formed. Generally, in the inkjet method, images are formed based on subtractive color mixture for forming full-color images. Therefore, yellow, magenta, and cyan are used as the three primary colors, and black is added, and these four colors are used as the basic colors to form an image. Therefore, there is a demand for technical development to improve the color reproducibility of images formed by using inks having these color tones and of images formed by mixing these color tones.

Japanese Patent Application Laid-Open No. 2020-50843, for example, discloses a water based ink set containing a black ink, a cyan ink, magenta ink, and a yellow ink. In the ink set, the ratios of the maximum absorbance of the cyan ink, magenta ink, and yellow ink to the absorbance of the black ink at the wavelength exhibiting the maximum absorbance are 0.41 or more and 0.80 or less. According to Japanese Patent Application Laid-Open No. 2020-50843, color reproducibility in dark areas of images can be improved.

However, when an image formed by using the ink set described in Japanese Patent Application Laid-Open No. 2020-50843 absorbs ultraviolet light, such as when left in the outdoor, the colorant in the ink forming the image is decomposed by the ultraviolet light, and the color density of the image may be lowered over time. The amount of absorption of ultraviolet light differs for each color tone of ink in the ink set, thus, the degree of color fading differs for each color, and the balance of color tones in an image may decrease.

The present inventors have thus tried to add an ultraviolet absorber to each ink and adjust the amount of the ultraviolet absorber added for each ink. Color fading still occurred at different degrees between the colors, resulting in decreasing of the balance of color tones in the image in some cases.

It is also known that the appearance (visibility) of an image formed by using ink or the like changes depending on the type of light source at the time of observation. The ink set described in Japanese Patent Application Laid-Open No. 2020-50843 is expected to equalize the visibility of colors regardless of the type of light source because the difference in absorbance of the colors is reduced. However, the studies conducted by the present inventors show that there is a large variation in visibility depending on the type of light source even in the image formed by using the ink set described in Japanese Patent Application Laid-Open No. 2020-50843. Further studies on the variation in visibility show that there is a large difference between the color tone measured with the D65 light source, which includes ultraviolet light, and the color tone measured with the C light source, which does not include ultraviolet light. From the above results, it can be considered that the measured color tone (color reproducibility) varies greatly depending on the degree (amount) of ultraviolet light contained in the light emitted from the light source, and accordingly, the visibility also varies greatly between colors.

SUMMARY

The present invention has been made in view of the above situations. An object of the present invention is to provide an ink set and an image forming method both capable of, for an image formed with ink, preventing deterioration of the color tone balance of the image caused by color fading due to ultraviolet light, and of minimizing difference in color reproducibility regardless of the degree of ultraviolet light contained in light emitted from a light source used for observing the image.

Solution to Problem

To achieve at least one of the abovementioned objects, according to an aspect of the present invention, an ink set reflecting one aspect of the present invention contains four types of inks that are a yellow ink, a magenta ink, a cyan ink, and a black ink. Each of the four types of inks contains water and a colorant, and at least one of the four types of inks contains an ultraviolet absorber. The four types of inks with R (Y, K), R (M, K), and R (C, K) satisfy condition (a) in which R (Y, K), R (M, K), and R (C, K) are all 0.2 or more and 1.0 or less and condition (b) in which a difference between maximum and minimum values of R (Y, K), R (M, K), and R (C, K) is 0.5 or less, where R (Y, K), R (M, K), and R (C, K) are represented by Equations (1) to (3) below $$R(Y,K) = Abs(Y)/Abs(K) \quad \text{Equation (1)}$$

$$R(M,K) = Abs(M)/Abs(K) \quad \text{Equation (2) and}$$

$$R(C,K) = Abs(C)/Abs(K) \quad \text{Equation (3), where}$$

Abs (Y) represents absorbance of the yellow ink with respect to light having a wavelength of 385 nm, Abs (M) represents absorbance of the magenta ink with respect to the light, Abs (C) represents absorbance of the cyan ink with respect to the light, and Abs (K) represents absorbance of the black ink with respect to the light.

To achieve at least one of the abovementioned objects, according to an aspect of the present invention, an image forming method reflecting one aspect of the present invention uses four types of inks that are a yellow ink, a magenta ink, a cyan ink, and a black ink. The method including applying one of the yellow ink, the magenta ink, and the cyan ink onto the surface of a recording medium; and applying another one of the yellow ink, the magenta ink, and the cyan ink onto the surface of the recording medium. Each of the four types of inks contains water and a colorant, and at least one of the four types of inks contains an ultraviolet absorber. The four types of inks with R (Y, K), R (M, K), and R (C, K) satisfy condition (a) in which R (Y, K), R (M, K), and R (C, K) are all 0.2 or more and 1.0 or less and condition (b) in which a difference between maximum and minimum values of R (Y, K), R (M, K), and R (C, K) is 0.5 or less, where R (Y, K), R (M, K), and R (C, K) are represented by Equations (1) to (3) below $$R(Y,K)=Abs(Y)/Abs(K) \qquad \text{Equation (1)}$$

$$R(M,K)=Abs(M)/Abs(K) \qquad \text{Equation (2) and}$$

$$R(C,K)=Abs(C)/Abs(K) \qquad \text{Equation (3), where}$$

Abs (Y) represents absorbance of the yellow ink with respect to light having a wavelength of 385 nm, Abs (M) represents absorbance of the magenta ink with respect to the light, Abs (C) represents absorbance of the cyan ink with respect to the light, and Abs (K) represents absorbance of the black ink with respect to the light.

Advantageous Effects of Invention

The present invention provides an ink set and an image forming method both capable of, for an image formed with ink, preventing deterioration of the color tone balance of the image caused by color fading due to ultraviolet light, and of minimizing difference in color reproducibility regardless of the degree of ultraviolet light contained in light emitted from a light source used for observing the image.

BRIEF DESCRIPTION OF DRAWINGS

The advantageous and features provided by one or more embodiments of the invention will become more fully understood from the detailed description given hereinbelow and the appended drawing which are given by way of illustration only, and thus are not intended as a definition of the limits of the present invention:

The FIGURE illustrates the configuration of an image forming apparatus according to an embodiment of the present invention.

DETAILED DESCRIPTION OF EMBODIMENTS

Hereinafter, one embodiment of the present invention will be described with reference to the drawings. However, the scope of the invention is not limited to the disclosed embodiments.

1. Ink Set

To achieve at least one of the abovementioned objects, an ink set according to an embodiment of the present invention contains four types of inks, namely a yellow ink, a magenta ink, a cyan ink, and a black ink. Each of the four types of inks contains water and a colorant, and at least one of the four types of inks contains an ultraviolet absorber. When the absorbance of the yellow ink with respect to light having a wavelength of 385 nm is Abs (Y), the absorbance of the magenta ink with respect to the light is Abs (M), the absorbance of the cyan ink with respect to the light is Abs (C), and the absorbance of the black ink with respect to the light is Abs (K), the four types of inks with R (Y, K), R (M, K), and R (C, K) represented by equations (1) to (3) satisfy conditions (a) and (b).

$$R(Y,K)=Abs(Y)/Abs(K) \qquad \text{Equation (1)}$$

$$R(M,K)=Abs(M)/Abs(K) \qquad \text{Equation (2)}$$

$$R(C,K)=Abs(C)/Abs(K) \qquad \text{Equation (3)}$$

Condition (a): R (Y, K), R (M, K), and R (C, K) are all 0.2 or more and 1.0 or less Condition (b): any difference between absorbance ratios selected from R (Y, K), R (M, K), and R (C, K) is 0.5 or less As described above, even when an image is formed by using an ink capable of improving color reproducibility as in Japanese Patent Application Laid-Open No. 2020-50843, light resistance to ultraviolet light is not satisfactory, and photodecomposition of a colorant may occur as the image absorbs ultraviolet light, resulting in color fading over time. In addition, as the absorbance of ultraviolet light differs for each color tone of ink, the degree of color fading differs for each color, and thus the balance of color tones in an image may decrease.

The present inventors then consider adding an ultraviolet absorber to the ink, whose color is more likely to fade, in order to increase the light resistance to ultraviolet light. Even so, the color balance of the image after storage cannot be improved in some cases. The studies conducted by the present inventors show that when ultraviolet light is absorbed by the ultraviolet absorber, the ultraviolet light energy is converted into heat energy in the image, and the generated heat may cause the decomposition of the colorant in the image. Due to the color fading caused by thermal decomposition of the colorant, adjusting the balance of color tones in the image become more difficult in some cases.

As described above, the measured color tone (color reproducibility) may vary greatly depending on the degree (amount) of ultraviolet light contained in the light emitted from the light source.

As a result of extensive studies conducted by the present inventors for solving the above problems, the following has been found for inks with yellow, magenta, cyan, and black as the main color tones: the degree of color fading caused by the thermal decomposition as described above can be adjusted to the same degree between the colors, thereby improving the balance of color tones in the image. This can be achieved by adding an ultraviolet absorber to each ink to adjust the absorbance at a wavelength of 385 nm, which is included in the ultraviolet region, while minimizing the color fading caused by photodecomposition of the colorant. That is, it has been found that adding an ultraviolet absorber even to the ink that inherently has low absorbance for ultraviolet light to adjust the absorbance of each ink can improve the balance of color tones in an image.

Specifically, when Abs (Y) is defined as the absorbance of the yellow ink, Abs (M) is defined as the absorbance of the magenta ink, Abs (C) is defined as the absorbance of the cyan ink, and Abs (K) is defined as the absorbance of the black ink as described above, an adjustment is made in such a way that R (Y, K), R (M, K), and R (C, K) represented by equations (1) to (3) are all 0.2 or more and 1.0 or less, and the maximum difference between two values in R (Y, K), R (M, K), and R (C, K) is 0.5 or less.

$$R(Y,K) = \text{Abs}(Y)/\text{Abs}(K) \quad \text{Equation (1)}$$

$$R(M,K) = \text{Abs}(M)/\text{Abs}(K) \quad \text{Equation (2)}$$

$$R(C,K) = \text{Abs}(C)/\text{Abs}(K) \quad \text{Equation (3)}$$

Herein, "yellow ink" refers to an ink capable of forming a yellow image when applied alone to a recording medium. "Magenta ink" refers to an ink capable of forming a magenta image when applied alone to a recording medium. "Cyan ink" refers to an ink capable of forming a cyan image when applied alone to a recording medium. "Black ink" refers to an ink capable of forming a black image when applied alone to a recording medium. These inks contain water as a liquid component and are referred to as water based inks, and the above-described ink set referred to as water based ink set. However, the types and contents of water and other liquid components in each ink are not limited so long as the problems of the present invention are solved.

Further, the present inventors have found that an image formed from these inks can reduce the difference in color reproducibility due to the degree (amount) of ultraviolet light in a light source used for observing the image (hereinafter also simply referred to as "difference in color reproducibility"). The reason why the difference in color reproducibility can be reduced by adjusting the absorbance of each ink is considered as follows.

During the observation of an image with a light source including ultraviolet light, when the inks differ in the absorbance for ultraviolet light, the inks may also differ in the absorbance for light on the short wavelength side close to the ultraviolet region in the visible light region. Therefore, when the image is observed with a light source including ultraviolet light, the intensity of reflected light varies among the inks, and color reproducibility may vary. By allowing the inks to absorb light with an ultraviolet wavelength of 385 nm and adjusting the absorbance of the inks with respect to light of the above wavelength to the substantially the same degree (herein simply referred to as "the same degree"), the absorbance of the inks with respect to light on the short wavelength side can be adjusted to the same degree. Since the absorbance of the inks with respect to light on the short wavelength side can be set to approximately the same degree, color reproducibility can be improved regardless of the level of ultraviolet light included in the light source.

The values of R (Y, K), R (M, K), and R (C, K) are all 0.2 or more and 1.0 or less, but preferably 0.5 or more and 0.8 or less. When R (Y, K), R (M, K), and R (C, K) are each 0.2 or more, the difference between the maximum and minimum values of R (Y, K), R (M, K), and R (C, K) can be reduced. This can be considered to have the following advantages as described below: the lowering of color balance can be prevented by reducing the difference in the degree of color fading due to thermal decomposition of a colorant caused by the absorption of ultraviolet light; and also the difference in color reproducibility depending on the presence or absence of ultraviolet light in the light source can be reduced. Values of R (Y, K), R (M, K), and R (C, K) of 1.0 or less can prevent the thermal decomposition of the colorant in the image due to excessive absorption of ultraviolet light, thereby preventing the color fading of the image.

The absorbance of each ink described above is a value measured by using a spectrophotometer (U-3300, manufactured by Hitachi, Ltd.). Specifically, the absorbance is measured by the following steps: each ink is diluted 4,000 times with pure water, placed in a quartz glass cell with an optical path length of 10 mm, and then scanned from a wavelength of 340 nm to a wavelength of 800 nm at intervals of 5 nm or less, and the absorbance is measured at a wavelength of 385 nm in the obtained absorption spectrum. At this time, pure water is used as a reference.

When each value of R (Y, K), R (M, K), and R (C, K) falls within the above numerical ranges, and the difference between the maximum and minimum values thereof does not exceed 0.5, the difference in ultraviolet absorbance between the inks becomes small. This is considered why the lowering of color balance can be prevented: by reducing the difference in the degree of color fading due to thermal decomposition of a colorant caused by the absorption of ultraviolet light. By reducing the difference in the absorbance of ultraviolet light between the inks, the absorbance of the inks with respect to light on the short wavelength side of the visible light region can be set to approximately the same degree, thereby reducing the difference in color reproducibility.

The difference between the maximum and minimum values of R (Y, K), R (M, K), and R (C, K) is not more than 0.5, but preferably 0.1 or more and 0.5 or less, more preferably 0.1 or more and 0.3 or less. The difference of 0.3 or less can further reduce the difference in the degree of color fading due to thermal decomposition of a colorant caused by the absorption of ultraviolet light.

In the present embodiment, at least one of the yellow ink, magenta ink, cyan ink, and black ink contains an ultraviolet absorber. This can prevent photodecomposition of a colorant after image formation. The content of the ultraviolet absorber in an ink, among these inks, containing the ultraviolet absorber is not limited. The content of the ultraviolet absorber is preferably 0.1 mass % or more and 3.0 mass % or less, more preferably 1.0 mass % or more and 2.0 mass %, further preferably 0.5 mass % or more and 2.0 mass % or less, with respect to the total mass of the ink containing the ultraviolet absorber. Content of 0.1 mass % or more can prevent the photodecomposition of the colorant to be caused by ultraviolet light, thereby further preventing the color fading of the image. Content of 0.3 mass % or less can improve color reproducibility by satisfactorily preventing the color tone of the formed image from becoming yellow, which is the complementary color of the wavelength absorbed by the ultraviolet absorber. In addition, thermal decomposition of the colorant in the image due to excessive absorption of ultraviolet light is also prevented, thereby preventing the color fading of the image.

Any method may be used for adjusting R (Y, K), R (M, K), and R (C, K) to fall within the range of condition (a); however, from the viewpoint facilitating the adjustment of the color balance of the image, the content of the ultraviolet absorber in the ink set is preferably adjusted for each ink. For example, with none of the yellow ink, magenta ink, cyan ink, and black ink containing an ultraviolet absorber, ultraviolet light (wavelength: 385 nm) absorbance of each ink is measured, an ultraviolet absorber is added at least one of the inks, and then the content of the ultraviolet absorber is adjusted so that R (Y, K), R (M, K), and R (C, K) fall within desired ranges.

In the ink set, it is preferable that the content of the ultraviolet absorbent is in the order of magenta ink (largest content), cyan ink, yellow ink, and black ink (smallest content). The absorbance of the magenta colorant to ultraviolet light is lower than that of the yellow and cyan colorants. Therefore, adding an ultraviolet absorber to the magenta ink at a larger amount than other inks can increase the absorbance of the magenta ink, thereby reducing the difference in absorbance from other inks and improving the color tone balance of the image. From the same viewpoint, it is preferable to adjust the content of the ultraviolet absorbers for the other inks, and to set the amounts of the ultraviolet absorbers in the ink set in the above order. The details of the preferred range of the content of the ultraviolet absorber in each ink will be described below.

1-1. Yellow Ink

As described above, "yellow ink" refers to an ink capable of forming a yellow image when applied alone to a recording medium.

1-1-1. Water

The yellow ink contains water. The type of water contained in the yellow ink is not limited. The water content in the yellow ink is not limited, but is preferably 50 mass % or more with respect to the total mass of the yellow ink. Content of 50 mass % or more allows the ink to have fluidity to satisfactorily increase the ejection property of the ink. From the above viewpoint, the content of water is preferably 50 mass % or more with respect to the total mass of the liquid components in the ink.

1-1-2. Colorant

The yellow ink contains a colorant. The colorant contained in the yellow ink is not limited, and is, for example, a dye or a pigment. From the viewpoint of increasing the water resistance and light resistance of formed images, the coloring agent is preferably a pigment.

The yellow ink usually contains a yellow colorant, but may contain a colorant having a color tone other than yellow to give a yellow color. Herein, "yellow colorant" refers to a yellow dye or a yellow pigment.

Examples of the yellow dye include C.I. Acid Yellow 7:1, 17, 19, 23, 25, 29, 38, 42, 49, 61, 72, 78, 110, 127, 135, 141, and 142 (all manufactured by Tokyo Chemical Industry Co., Ltd.).

Examples of yellow pigments include C.I. Pigment Yellow 12, C.I. Pigment Yellow 13, 14, 15, 15:3, 17, 74, 93, 128, 94, 138, and 155 (all manufactured by Tokyo Chemical Industry Co., Ltd.).

A yellow ink containing a pigment preferably contains a pigment dispersant. The content of the pigment dispersant is not limited, but is preferably 0.1 mass % or more and 10.0 mass % or less with respect to the total mass of the yellow ink. The content of the pigment dispersant is more preferably 0.5 mass % or more and 5.0 mass % or less.

Examples of the pigment dispersant include DISPERBYK-190, DISPERBYK-2164, DISPERBYK-168, and DISPERBYK N22024 (all manufactured by BYK).

The particle diameter of the yellow pigment particles is not limited, but from the viewpoint of further improving color reproducibility, the volume-based median diameter is preferably 50 nm or more and 200 nm or less. The particle diameter of the pigment can be determined, for example, with a commercially available particle diameter measuring instrument using a dynamic light scattering method or an electrophoresis method. Measurement by the dynamic light scattering method is preferred from the viewpoint of simple and highly accurate measurement.

The content of the colorant in the yellow ink is not limited, but is preferably 0.5 mass % or more and 10.0 mass % or less with respect to the total mass of the yellow ink. Content of 0.5 mass % or more can further improve color reproducibility, and content of 10 mass % or less can further increase dispersion stability of the colorant in the ink.

1-1-3. Ultraviolet Absorber

In the present embodiment, the yellow ink may contain an ultraviolet absorber.

The type of ultraviolet absorber is not limited. Examples of the ultraviolet absorber include benzophenone ultraviolet absorbers, benzotriazole ultraviolet absorbers, benzoate ultraviolet absorbers, and triazine ultraviolet absorbers.

Examples of commercially available benzophenone ultraviolet absorbers include ADK STAB 1413 (manufactured by ADEKA CORPORATION, "ADK STAB" is a registered trademark of the company), SEESORB 100, 101, 101S, 102, 103, 106, and 107 (all manufactured by Shipro Kasei Kaisha, Ltd., "SEESORB" is a registered trademark of the company), Sumisorb 130 (manufactured by Sumika Chemtex Company, Limited, "Sumisorb" is a registered trademark of Sumitomo Chemical Company, Limited), and KEMISORB 10, 11, 11S, and 12 (all manufactured by Chemipro Kasei Kaisha, Ltd., "KEMISORB" is a registered trademark of the company).

Examples of commercially available benzotriazole ultraviolet absorbers include Tinuvin 109, 171, 234, 326, 327, 329, 360, and 928 (all manufactured by BASF Japan Ltd., "Tinuvin" is a registered trademark of BASF), SEESORB 701, 703, 704, 706, 707, and 709 (all manufactured by Shipro Kasei Kaisha, Ltd.), Sumisorb 200, 250, 300, 340, and 350 (all manufactured by Sumika Chemtex Company, Limited), and KEMIISORB 71, 73, 74, 79, and 279 (all manufactured by Chemipro Kasei Kaisha, Ltd.).

Examples of commercially available benzoate ultraviolet absorbers include Tinuvin 120 (manufactured by BASF Japan Ltd.), SEESORB 712 (manufactured by Shipro Kasei Kaisha, Ltd.), Sumisorb 400 (manufactured by Sumika Chemtex Company, Limited), and KEMISORB 112, 113, and 113 (all manufactured by Chemipro Kasei Kaisha, Ltd.).

Examples of commercially available triazine ultraviolet absorbers include Tinuvin 477-DW (N) (manufactured by BASF Japan Ltd.) and KEMISORB 102 (manufactured by Chemipro Kasei Kaisha, Ltd.).

In the present embodiment, the yellow ink preferably contains an ultraviolet absorber that is contained in resin particles. With the ultraviolet absorber contained in resin particles, aggregation of the ultraviolet absorber in the ink can be satisfactorily prevented even when the ultraviolet absorber to be used has low water solubility. Ink ejection stability thus can be satisfactorily increased. With the ultraviolet absorber contained in resin particles, the heat generated when the ultraviolet light is absorbed is less likely to reach the colorant, thereby preventing the color fading due to thermal decomposition of the colorant. From the above viewpoint, the ultraviolet absorber is preferably contained inside the resin particles. The resin particles may be used as a fixing resin.

The material of the resin particles is not limited. Examples of the material of the resin particles include acrylic resins, styrene resins, styrene-acrylic resins, urethane resins, and urethane-acrylic resins. The material of the resin particles is preferably an acrylic resin, a styrene resin, or a styrene-acrylic resin from the viewpoint of ejection stability and fixability. These resins have high heat resistance (but not that high to impair the fixability), so that the resins do not soften during the ejection, and thus adhesion to the ink nozzles is prevented, thereby increasing the ejection stability. The ultraviolet absorber may be contained in only one type of resin particles made from at least one of these resins, or may be contained in two or more types of resin particles.

From the viewpoint of increasing the dispersibility in the ink, the material of the resin particles is preferably a hydrophilic resin. Examples of the hydrophilic resin include acrylic resins, urethane resins, and urethane-acrylic resins. Herein, "hydrophilic resin" refers to a resin having a solubility of 10 g or more in water at 25° C. The hydrophilic resin may be a resin that is treated to become hydrophilic by, for example, introducing a hydrophilic group during polymerization.

The particle diameter of the resin particles containing the ultraviolet absorber is not limited, but is preferably 50 nm or more and 200 nm or less. The particle diameter of the resin particles can be determined, for example, with a commercially available particle diameter measuring instrument using a dynamic light scattering method or an electrophoresis method. Measurement by the dynamic light scattering method is preferred from the viewpoint of simple and highly accurate measurement.

Any method may be used for allowing the resin particles to contain an ultraviolet absorber. For example, when an ultraviolet absorber polymerizable with a monomer constituting a resin is used with the monomer, an emulsifier, and a polymerization initiator, the ultraviolet absorber undergoes a polymerization reaction with the monomer, thereby allowing the resin particles to contain the ultraviolet absorber.

The type of emulsifier is not limited, and may be any one of surfactants described below.

The type of polymerization initiator is not limited, and may be any one of known oil-soluble or water-soluble polymerization initiators.

Examples of the oil-soluble polymerization initiators include azo and diazo polymerization initiators and peroxide polymerization initiators.

Examples of the azo and diazo polymerization initiators include 2,2'-azobis(2,4-dimethylvaleronitrile), 2,2'-azobisisobutyronitrile, 1,1'-azobis(cyclohexane-1-carbonitrile), 2,2'-azobis-4-methoxy-2,4-dimethylvaleronitrile, and azobisisobutyronitrile.

Examples of the peroxide polymerization initiators include benzoyl peroxide, methyl ethyl ketone peroxide, diisopropyl peroxycarbonate, cumene hydroperoxide, t-butyl hydroperoxide, di-t-butyl peroxide, dicumyl peroxide, 2,4-dichlorobenzoyl peroxide, lauroyl peroxide, 2,2-bis(4,4-t-butylperoxycyclohexyl)propane, and tris-(t-butylperoxy)triazine.

Examples of the water-soluble polymerization initiators include persulfates such as potassium persulfate and ammonium persulfate, salts of azobis-aminodipropane acetic acid, azobis-cyanovaleric acid and salts thereof, and hydrogen peroxide.

Examples of the reactive ultraviolet absorber include 2(2'-hydroxy-5'-methacryloxyethylphenyl)-2H-benzotriazole (RUVA-93, manufactured by Otsuka Chemical Co., Ltd.) and DAINSORB T-31 (trade name, from Daiwa Fine Chemicals Co., Ltd.).

The ink may contain a commercially available product containing an ultraviolet absorber in resin particles. Examples of commercial products containing an ultraviolet absorber in resin particles include Tinuvin 9945-DW(N), Tinuvin 400-DW(N), Tinuvin 477-DW(N), Tinuvin 479-DW(N), Tinuvin 123-DW(N), and Tinuvin 5333-DW(N) (all manufactured by BASF Japan Ltd.).

The content of the resin particles is not limited, but is preferably 0.5 mass % or more and 15 mass % or less with respect to the total mass of the yellow ink. Content of 0.5 mass % or more can increase the amount of resin particles containing an ultraviolet absorber, thereby further improving the light resistance of the image. Content of 15 mass % or less can prevent the increase in viscosity of the ink, thereby further increasing the ejection stability of the ink. Content within the above range allows easy adjustment of the difference between the maximum and minimum values of R (Y, K), R (M, K), and R (C, K) to fall within a desired range. The difference in color reproducibility thus can be further reduced, and the color fading of the ink can be easily adjusted to the same degree as other inks.

When the yellow ink contains an ultraviolet absorber, the content of the ultraviolet absorber with respect to the total mass of the yellow ink is not limited, but is preferably 0.1 mass % or more and 3.0 mass % or less, more preferably 0.1 mass % or more and 1.0 mass % or less. Content of the ultraviolet absorber within the above range allows easy adjustment of the difference between the maximum and minimum values of R (Y, K), R (M, K), and R (C, K) to fall within a desired range. The difference in color reproducibility thus can be further reduced, and the color fading of the ink can be easily adjusted to the same degree as other inks. The content of the ultraviolet absorber can be obtained by specifying the component, obtaining a high performance liquid chromatography (HPLC) calibration curve with the substance, and calculating from the area % of the component.

The content of the ultraviolet absorber contained in the resin particles is not limited, but is preferably 1 mass % or more and 20 mass % or less per resin particle as an active ingredient. Content of 1 mass % or more allows the yellow ink to contain a larger amount of the ultraviolet absorber while the aggregation of the ultraviolet absorber is prevented, thereby satisfactorily preventing the color fading due to photodecomposition of the colorant. Content of 20 mass % or less can prevent precipitation of the ultraviolet absorber. The content of the ultraviolet absorber per resin particle can be obtained, for example, by melting a plurality of resin particles, determining the amount of the ultraviolet absorber contained therein by high performance liquid chromatography (HPLC), and dividing the determined amount by the number of particles measured with a particle counter.

1-1-4. Organic Solvent

In the present embodiment, the yellow ink may contain an organic solvent. The type of organic solvent is not limited, but is preferably a water-soluble organic solvent from the viewpoint of increasing compatibility with water. Herein, "water-soluble organic solvent" means an organic solvent having a solubility of 5 g or more in water at 25° C. Examples of water-soluble organic solvents include alcohols, polyhydric alcohols, amines, amides, glycol ethers, and 1,2-alkanediols having 4 or more carbon atoms. The ink may contain only one type or a combination of two or more types of organic solvents.

Examples of the alcohols include methanol, ethanol, propanol, isopropanol, butanol, isobutanol, secondary butanol, and tertiary butanol.

Examples of the polyhydric alcohols include ethylene glycol, diethylene glycol, triethylene glycol, tetraethylene glycol, polyethylene glycol having 5 or more ethylene oxide groups, propylene glycol, dipropylene glycol, tripropylene glycol, propylene glycol having 4 or more propylene oxide groups, butylene glycol, hexanediol, pentanediol, glycerin, hexanetriol, and thiodiglycol.

Examples of the amines include ethanolamine, diethanolamine, triethanolamine, N-methyldiethanolamine, N-ethyldiethanolamine, morpholine, N-ethylmorpholine, ethylenediamine, diethylenediamine, triethylenetetramine, tetraethylenepentamine, polyethyleneimine, pentamethyldiethylenetriamine, and tetramethylpropylenediamine.

Examples of the amides include formamide, N,N-dimethylformamide, and N,N-dimethylacetamide.

Examples of the glycol ethers include ethylene glycol monoethyl ether, ethylene glycol monobutyl ether, diethylene glycol monoethyl ether, diethylene glycol monobutyl ether, triethylene glycol monobutyl ether, propylene glycol monopropyl ether, dipropylene glycol monomethyl ether, and tripropylene glycol monomethyl ether.

Examples of the 1,2-alkanediols having 4 or more carbon atoms include 1,2-butanediol, 1,2-pentanediol, 1,2-hexanediol, and 1,2-heptanediol.

Among these, when the organic solvent is a polyhydric alcohol, bleeding during high-speed printing can be suitably prevented. Examples of preferred polyhydric alcohols include ethylene glycol, diethylene glycol, triethylene glycol, tetraethylene glycol, propylene glycol, dipropylene glycol, and tripropylene glycol.

The content of the organic solvent in the yellow ink is not limited, but is preferably 5.0 mass % or more and 30.0 mass % or less with respect to the total mass of the yellow ink. Content of 0.5 mass % or more can improve the wettability of the ink to the recording medium. Content of 30 mass % or less can easily adjustment the ink viscosity so as to prevent the lowering of ink ejection stability; and also prevent the lowering of the drying property of the ink after landing on a recording medium.

In the present embodiment, the proportion of water and organic solvent in the liquid components of the ink is preferably 85 mass % or more, more preferably 90 mass % or more.

1-1-5. Additional Components

The yellow ink may contain an additional component such as a fixing resin, a surfactant, a pH adjuster, fine oil droplets, a fluorescent brightener, polysaccharide, a viscosity modifier, a resistivity modifier, a film-forming agent, an antioxidant, an antifungal agent, and/or a rust inhibitor according to the purpose. Only one type of these components may be contained, or two or more types may be contained in combination.

The fixing resin is preferably a water-soluble resin or a water-dispersible resin because of the high compatibility of the resins with the ink. Examples of the fixing resin include acrylic resins, urethane resins, urethane-acrylic resins, polyester resins, polyamine resins, polyvinyl alcohol, and water-dispersible latex resins.

These resins may have a cross-linkable group. Examples of the cross-linkable group include amine group, urethane bond, urea bond, polyols having hydroxyl groups on adjacent carbon molecules thereof, and carboxyl group.

When the fixing resin has a cross-linkable group, the ink may contain a cross-linker. Examples of the cross-linker include carbodiimide compounds, isocyanate compounds, epoxy compounds, silyl compounds, hydrazine compounds, and oxazoline compounds.

Examples of the surfactant include anionic surfactants such as dialkyl sulfosuccinates, alkylnaphthalene sulfonates, and fatty acid salts; nonionic surfactants such as polyoxyethylene alkyl ethers, polyoxyethylene alkylallyl ethers, acetylene glycols, and polyoxyethylene-polyoxypropylene block copolymers; cationic surfactants such as alkylamine salts and quaternary ammonium salts; silicone surfactants; and fluorinated surfactants.

Examples of the pH adjuster include known acids, bases, and buffers. In particular, ammonia, monomethylamine, dimethylamine, trimethylamine, monoethylamine, diethylamine, triethylamine, methylethylamine, monoethanolamine, diethanolamine, triethanolamine, ethylenediamine, methylaminoethanol, and dimethylaminoethanol, and salts thereof are preferred as they are less likely to inhibit the reaction between the cross-linkable resin and the cross-linker.

1-1-6. Physical Properties

From the viewpoint of increasing the ejection stability of the yellow ink from the nozzles of an inkjet head, the yellow ink preferably has a viscosity of 1 cP or more and less than 100 cP. From the viewpoint of further increasing the ejection stability, the viscosity of the yellow ink is more preferably 1 cP or more and 50 cP or less, and further preferably 1 cP or more and 15 cP or less.

From the viewpoint of increasing the ejection stability from the nozzles of an inkjet head, the surface tension of the yellow ink is preferably 20 mN/m or more and 50 mN/m or less. From the viewpoint of increasing the wettability with respect to the recording medium to obtain a high-definition image, the surface tension of the yellow ink is more preferably 20 mN/m or more and 35 mN/m or less. The surface tension of the yellow ink can be adjusted to fall within the above range by changing at least one of the types and amounts of the surfactant and organic solvent.

Absorbance Abs (Y) of the yellow ink with respect to light having a wavelength of 385 nm is not limited, so long as conditions (a) and (b) are satisfied, but is preferably 0.5 or more and 0.9 or less, more preferably 0.6 or more and 0.8 or less. Abs (Y) of 0.5 or more can reduce the difference between the maximum and minimum values of R (Y, K), R (M, K), and R (C, K), thereby further reducing the difference in color reproducibility. Abs (Y) of 0.9 or less can further prevent the thermal decomposition of the colorant due to excessive absorption of ultraviolet light.

The value of R (Y, K) in equation (1) is 0.2 or more and 1.0 or less, but preferably 0.5 or more and 1.0 or less, more preferably 0.7 or more and 1.0 or less. A value of R (Y, K) within the above range can further reduce the difference in color reproducibility, thereby preventing lowering of color balance due to the color fading.

1-1-7. Preparation of Yellow Ink

The yellow ink can be prepared by mixing the components described above.

When a pigment is used as a colorant, a pigment dispersion liquid containing the pigment and a pigment dispersant may be prepared in advance and mixed with the other components to prepare the yellow ink. The pigment can be dispersed by using, for example, a ball mill, a sand mill, an attritor, a roll mill, an agitator, a Henschel mixer, a colloid mill, an ultrasonic homogenizer, a pearl mill, a wet jet mill, or a paint shaker.

1-2. Magenta Ink

As described above, "magenta ink" refers to an ink capable of forming a magenta image when applied alone to a recording medium.

1-2-1. Water

The magenta ink contains water. The type and content of water contained in the magenta ink may be the same as those described for the yellow ink, and thus the detailed description thereof is omitted.

1-2-2. Colorant

The magenta ink contains a colorant. The colorant contained in the magenta ink is not limited, and is, for example, a dye or a pigment. From the viewpoint of increasing the water resistance and light resistance of formed images, the coloring agent is preferably a pigment.

The magenta ink usually contains a magenta colorant, but may contain a colorant having a color tone other than magenta to give a magenta color. Herein, "magenta colorant" refers to a magenta dye or a magenta pigment.

Examples of the magenta dye include C.I. Acid Red 8, 9, 14, 18, 26, 27, 35, 37, 51, 57, 82, 87, 92, 94, 111, 129, 131, 138, 186, 249, 254, 265, and 276 (all manufactured by Tokyo Chemical Industry Co., Ltd.).

Examples of the magenta pigment include C.I. Pigment Red 2, C.I. Pigment Red 3, 5, 6, 7, 15, 16, 48; 1, 53; 1, 57; 1, 122, 123, 139, 144, 149, 150, 166, 177, 178, 184, 222, and 238.

A magenta ink containing a pigment preferably contains a pigment dispersant. The content of the pigment dispersant is not limited, but is preferably 0.1 mass % or more and 10.0 mass % or less with respect to the total mass of the magenta ink. The content of the pigment dispersant is more preferably 0.5 mass % or more and 5.0 mass % or less.

Examples of the pigment dispersant include DISPERBYK-190, DISPERBYK-2164, DISPERBYK-168, and DISPERBYK N22024 (all manufactured by BYK).

The pigment can be dispersed by using, for example, a ball mill, a sand mill, an attritor, a roll mill, an agitator, a Henschel mixer, a colloid mill, an ultrasonic homogenizer, a pearl mill, a wet jet mill, or a paint shaker.

The particle diameter of the magenta pigment particles is not limited, but from the viewpoint of further improving color reproducibility, the volume-based median diameter is preferably 50 nm or more and 200 nm or less. The particle diameter of the pigment can be determined, for example, with a particle diameter measuring instrument using a dynamic light scattering method or an electrophoresis method. Measurement by the dynamic light scattering method is preferred from the viewpoint of simple and highly accurate measurement.

The content of the colorant in the magenta ink is not limited, but is preferably 0.5 mass % or more and 10.0 mass % or less with respect to the total mass of the magenta ink. Content of 0.5 mass % or more can further improve color reproducibility, and content of 10 mass % or less can further increase dispersion stability of the colorant in the ink.

1-2-3. Ultraviolet Absorber

The magenta ink may contain an ultraviolet absorber. The type and content of the ultraviolet absorber contained in the magenta ink may be the same as those described for the yellow ink.

In addition, the ultraviolet absorber is preferably contained in resin particles. The type and particle diameter of the resin particles, and the content of the ultraviolet absorber per resin particle may be the same as those described for the yellow ink.

When the magenta ink contains an ultraviolet absorber, the content of the ultraviolet absorber with respect to the total mass of the magenta ink is not limited, but is preferably 0.1 mass % or more and 3.0 mass % or less, more preferably 0.1 mass % or more and 3.0 mass % or less, further preferably 1.2 mass % or more and 2.5 mass % or less. Content of the ultraviolet absorber within the above range allows easy adjustment of the maximum difference between two values in R (Y, K), R (M, K), and R (C, K) to fall within a desired range. The difference in color reproducibility thus can be reduced, and the color fading of the ink can be easily adjusted to the same degree as other inks.

1-2-4. Organic Solvent

The magenta ink may contain an organic solvent. The type and content of the organic solvent contained in the magenta ink may be the same as those described for the yellow ink, and thus the detailed description thereof is omitted.

1-2-5. Additional Components

Regarding the additional components to be contained in the magenta ink, components the same as those contained in the yellow ink may be appropriately used, according to the purpose.

1-2-6. Physical Properties

The viscosity and surface tension of the magenta ink may be the same as those described for the yellow ink, and thus the detailed description thereof is omitted.

Absorbance Abs (M) of the magenta ink with respect to light having a wavelength of 385 nm is not limited, so long as conditions (a) and (b) are satisfied, but is preferably 0.3 or more and 0.8 or less, more preferably 0.3 or more and 0.7 or less. Abs (M) of 0.3 or more can reduce the difference between the maximum and minimum values of R (Y, K), R (M, K), and R (C, K), thereby further reducing the difference in color reproducibility. Abs (M) of 0.8 or less can further prevent the thermal decomposition of the colorant due to excessive absorption of ultraviolet light.

The value of R (M, K) in equation (2) is 0.2 or more and 1.0 or less, but preferably 0.4 or more and 1.0 or less, more preferably 0.4 or more and 0.9 or less. A value of R (M, K) within the above range can further reduce the difference in color reproducibility, thereby preventing lowering of color balance due to the color fading.

1-2-7. Preparation of Magenta Ink

The magenta ink can be prepared in the same manner as described for the yellow ink, and thus the detailed description of the preparation is omitted.

1-3. Cyan Ink

As described above, "cyan ink" refers to an ink capable of forming a cyan image when applied alone to a recording medium.

1-3-1. Water

The cyan ink contains water. The type and content of water contained in the cyan ink may be the same as those described for the yellow ink, and thus the detailed description thereof is omitted.

1-3-2. Colorant

The cyan ink contains a colorant. The colorant contained in the cyan ink is not limited, and is, for example, a dye or a pigment. From the viewpoint of increasing the water resistance and light resistance of formed images, the coloring agent is preferably a pigment.

The cyan ink usually contains a cyan colorant, but may contain a colorant having a color tone other than cyan to give a cyan color. Herein, "cyan colorant" refers to a cyan dye or a cyan pigment.

Examples of the cyan dye include C.I. Acid Blue 1, 7, 9, 15, 22, 23, 25, 40, 41, 43, 62, 78, 83, 90, 93, 103, 112, 113, and 158 (all manufactured by Tokyo Chemical Industry Co., Ltd.).

Examples of the cyan pigment include C.I. Pigment Blue 15, 15; 2, 15; 3, 15; 4, 16, 60, 62, and 66 (all manufactured by Tokyo Chemical Industry Co., Ltd.).

A cyan ink containing a pigment preferably contains a pigment dispersant. The content of the pigment dispersant is not limited, but is preferably 0.1 mass % or more and 10.0 mass % or less with respect to the total mass of the cyan ink. The content of the pigment dispersant is more preferably 0.5 mass % or more and 5.0 mass %.

Examples of the pigment dispersant include DISPERBYK-190, DISPERBYK-2164, DISPERBYK-168, and DISPERBYK N22024 (all manufactured by BYK).

The pigment can be dispersed by using, for example, a ball mill, a sand mill, an attritor, a roll mill, an agitator, a Henschel mixer, a colloid mill, an ultrasonic homogenizer, a pearl mill, a wet jet mill, or a paint shaker.

The particle diameter of the cyan pigment particles is not limited, but from the viewpoint of further improving color reproducibility, the volume-based median diameter is preferably 50 nm or more and 200 nm or less. The particle diameter of the pigment can be determined, for example, with a particle diameter measuring instrument using a dynamic light scattering method or an electrophoresis method. Measurement by the dynamic light scattering method is preferred from the viewpoint of simple and highly accurate measurement.

The content of the colorant in the cyan ink is not limited, but is preferably 0.5 mass % or more and 10.0 mass % or less with respect to the total mass of the cyan ink. Content of 0.5 mass % or more can further improve color reproducibility, and content of 10 mass % or less can further increase dispersion stability of the colorant in the ink.

1-3-3. Ultraviolet Absorber

The cyan ink may contain an ultraviolet absorber. The type and content of the ultraviolet absorber contained in the cyan ink may be the same as those described for the yellow ink.

In addition, the ultraviolet absorber is preferably contained in resin particles. The type and particle diameter of the resin particles, and the content of the ultraviolet absorber per resin particle may be the same as those described for the yellow ink.

When the cyan ink contains an ultraviolet absorber, the content of the ultraviolet absorber with respect to the total mass of the cyan ink is not limited, but is preferably 0.1 mass % or more and 3.0 mass % or less, more preferably 0.5 mass % or more and 2.0 mass % or less. Content of the ultraviolet absorber within the above range allows easy adjustment of the maximum difference between two values in R (Y, K), R (M, K), and R (C, K) to fall within a desired range. The difference in color reproducibility thus can be reduced, and the color fading of the ink can be easily adjusted to the same degree as other inks.

1-3-4. Organic Solvent

The cyan ink may contain an organic solvent. The type and content of the organic solvent contained in the cyan ink may be the same as those described for the yellow ink, and thus the detailed description thereof is omitted.

1-3-5. Additional Components

Regarding the additional components to be contained in the cyan ink, components the same as those contained in the yellow ink may be appropriately used, according to the purpose.

1-3-6. Physical Properties

The viscosity and surface tension of the cyan ink may be the same as those described for the yellow ink, and thus the detailed description thereof is omitted.

Absorbance Abs (C) of the cyan ink with respect to light having a wavelength of 385 nm is not limited, so long as conditions (a) and (b) are satisfied, but is preferably 0.4 or more and 0.9 or less, more preferably 0.4 or more and 0.7 or less. Abs (C) of 0.4 or more can reduce the difference between the maximum and minimum values of R (Y, K), R (M, K), and R (C, K), thereby further reducing the difference in color reproducibility. Abs (C) of 0.9 or less can further prevent the thermal decomposition of the colorant due to excessive absorption of ultraviolet light.

The value of R (C, K) in equation (3) is 0.2 or more and 1.0 or less, but preferably 0.4 or more and 1.0 or less, more preferably 0.4 or more and 0.8 or less. A value of R (C, K) within the above range can further reduce the difference in color reproducibility, thereby preventing lowering of color balance due to the color fading.

1-3-7. Preparation of Cyan Ink

The cyan ink can be prepared in the same manner as described for the yellow ink, and thus the detailed description of the preparation is omitted.

1-4. Black Ink

As described above, "black ink" refers to an ink capable of forming a black image when applied alone to a recording medium.

1-4-1. Water

The black ink contains water. Water contained in the black ink may be the same as that described for the yellow ink, and thus the detailed description thereof is omitted.

1-4-2. Colorant

The black ink contains a colorant. The colorant contained in the black ink is not limited, and is, for example, a dye or a pigment. From the viewpoint of increasing the water resistance and light resistance of formed images, the coloring agent is preferably a pigment.

The black ink usually contains a black colorant, but may contain a colorant having a color tone other than black to give a black color. Herein, "black colorant" refers to a black dye or a black pigment.

Examples of the black dye include C.I. Acid Black 1, 2, 24, 26, 31, 52, 107, 109, 110, 119, and 154 (all manufactured by Tokyo Chemical Industry Co., Ltd.).

Examples of the black pigment include carbon black, and C.I. Pigment Black 7, 26, and 28.

The particle diameter of the black pigment particles is not limited, but from the viewpoint of further improving color reproducibility, the volume-based median diameter is preferably 50 nm or more and 200 nm or less. The particle diameter of the pigment can be determined, for example, with a particle diameter measuring instrument using a dynamic light scattering method or an electrophoresis method. Measurement by the dynamic light scattering method is preferred from the viewpoint of simple and highly accurate measurement.

The content of the colorant in the black ink is not limited, but is preferably 0.5 mass % or more and 10.0 mass % or less with respect to the total mass of the black ink. Content of 0.5 mass % or more can further improve color reproducibility, and content of 10 mass % or less can further increase dispersion stability of the colorant in the ink.

1-4-3. Ultraviolet Absorber

The black ink may contain an ultraviolet absorber. The type and content of the ultraviolet absorber contained in the black ink may be the same as those described for the yellow ink.

In addition, the ultraviolet absorber is preferably contained in resin particles. The resin particles may be the same as those described for the yellow ink.

When the black ink contains an ultraviolet absorber, the content of the ultraviolet absorber with respect to the total mass of the black ink is not limited, but is preferably 0.1 mass % or more and 3.0 mass % or less, more preferably 0.1 mass % or more and 1.0 mass % or less, further preferably 0.1 mass % or more and 0.5 mass % or less. Content of the ultraviolet absorber within the above range allows easy adjustment of the maximum difference between two values in R (Y, K), R (M, K), and R (C, K) to fall within a desired range. The difference in color reproducibility thus can be reduced, and the color fading of the ink can be easily adjusted to the same degree as other inks.

1-4-4. Organic Solvent

The black ink may contain an organic solvent. The organic solvent contained in the black ink may be the same as that described for the yellow ink, and thus the detailed description thereof is omitted.

1-4-5. Additional Components

Regarding the additional components to be contained in the black ink, components the same as those contained in the yellow ink may be appropriately used, according to the purpose.

1-4-6. Physical Properties

The viscosity and surface tension of the black ink may be the same as those described for the yellow ink, and thus the detailed description thereof is omitted.

1-4-7. Preparation of Black Ink

The black ink can be prepared in the same manner as described for the yellow ink, and thus the detailed description of the preparation is omitted.

2. Image Forming Method

An image forming method according to an embodiment of the present invention relates to a method for forming an image by using the ink set described above. The image forming method can be performed in the same manner as any conventionally known image forming method, except that the ink set described above is used. In the present embodiment, irradiating the ink with actinic radiation is not performed.

The image forming method in the present embodiment includes the following steps (however, the application order is not limited thereto): applying a yellow ink onto a recording medium, applying a magenta ink onto the recording medium, applying a cyan ink onto the recording medium, and applying a black ink onto the recording medium.

2-1. Applying Step

In this step, the above-described yellow ink, magenta ink, cyan ink, and black ink are applied to positions corresponding to the image to be formed on the recording medium.

The method for applying the inks onto the recording medium is not limited. Each ink may be applied to the surface of the recording medium with a roll coater, a spin coater, or the like, or may be applied to the surface of the recording medium by a method such as spray coating, dipping, screen printing, gravure printing, or offset printing. Alternatively, the ink may be landed on the surface of the recording medium by an inkjet method. From the viewpoint of forming a high-definition recorded matter, the inkjet method is preferred.

The ejection method from the inkjet head may be either an on-demand type or a continuous type. Examples of the on-demand inkjet head include inkjet heads in electro-mechanical conversion systems, such as single cavity, double cavity, bender, piston, shear mode, and shared wall types; and in electro-thermal conversion systems, such as thermal inkjet and bubble jet ("Bubble Jet" is a registered trademark of Canon, Inc.) types.

The type of recording medium is not limited. The recording medium may be, for example, a highly absorbent recording medium made of paper, a less absorbent recording medium such as coated paper for gravure or offset printing, or a non-absorbent recording medium such as a plastic board (made of, for example, soft vinyl chloride, hard vinyl chloride, or a polyolefin, or an acrylic board).

In addition, the inkjet head may be either a scan-type inkjet head or a line-type inkjet head, but the line-type inkjet head is preferred.

The order in which the inks are applied to the recording medium is not limited.

After the inks are applied to the recording medium, the recording medium may be appropriately dried at the position where the inks are applied. The drying method is not limited, and for example, a known heater, infrared lamp, or the like may be used.

3. Image Forming Apparatus

The FIGURE illustrates the configuration of image forming apparatus 100 capable of performing the image forming method described above.

Image forming apparatus 100 includes head carriage 110 with inkjet heads for ejecting ink droplets to land the ink droplets on regions on a recording medium. Image forming apparatus 100 may have dryer 120 for drying the ink applied on the recording medium.

Head carriage 110 includes, for example, inkjet head 111a for ejecting a yellow ink, inkjet head 111b for ejecting a magenta ink, inkjet head 111c for ejecting a cyan ink, and inkjet head 111d for ejecting a black ink. Inkjet heads 111a to 111d eject yellow, magenta, cyan, and black inks from respective nozzles 112a to 112d to land the inks on recording medium 140 conveyed by conveyance belt 130.

Any known heater, an irradiator that emits light from an infrared lamp, or the like can be used as dryer 120.

EXAMPLES

The present invention will be specifically described below with reference to Examples, but the present invention is not limited thereto.

1. Production of Ink Set 1-1. Preparation of Pigment Dispersion Liquid

To 18.0 parts by mass of a yellow pigment (Pigment Yellow 155, manufactured by Tokyo Chemical Industry Co., Ltd.), 5.4 parts by mass of pigment dispersant (graft copolymer: DISPERBYK-190 (acid value: 10 mg KOH/g, solid content: 40 mass %), manufactured by BYK Japan KK), 20.0 parts by mass of ethylene glycol, and 56.6 parts by mass of ion-exchanged water were added and mixed. Thereafter, the yellow pigment was dispersed with a sand grinder filled with 50% by volume of zirconia beads having an average particle diameter of 0.5 mm to prepare a yellow pigment dispersion liquid having a pigment content of 18.0 mass %.

A magenta pigment dispersion liquid, a cyan pigment dispersion liquid, and a black pigment dispersion liquid were obtained in the same manner as the yellow pigment dispersion liquid, except that the type of pigment was changed to the following pigments.

Magenta pigment: Pigment Red 122, manufactured by Tokyo Chemical Industry Co., Ltd.

Cyan pigment: Pigment Blue 15; 3, manufactured by Tokyo Chemical Industry Co., Ltd.

Black pigment: Carbon Black MA100, manufactured by Mitsubishi Chemical Corporation 1-2. Preparation of Inkjet Ink To 27.8 parts by mass of the yellow pigment dispersion liquid, while stirring the yellow pigment dispersion liquid, 20.0 parts by mass of propylene glycol, 5.0 parts by mass of glycerin, and 0.5 parts by mass of a silicone surfactant (KF-351A, manufactured by Shin-Etsu Chemical Co., Ltd.)

were added. Subsequently, ion-exchanged water was further added to produce an ink composition of the total of 100 parts by mass. The above ink composition was filtered through a 0.8 μm filter to obtain a yellow ink.

A magenta ink was obtained in the same manner as the yellow ink, except that the magenta pigment dispersion liquid was used in place of the yellow pigment dispersion liquid, and 1.2 parts by mass of an ultraviolet absorber (Tinuvin 477-DW (N) (solid content 40% by mass), manufactured by BASF) was added. The ultraviolet absorber is obtained by encapsulating hydroxyphenyltriazine in an acrylic polymer and dispersing the polymer in water. The active ingredient of the ultraviolet absorber is 20 mass % based on the solid content (that is, 1.2 parts by mass of the ultraviolet absorber is contained in 6.0 parts by mass of the acrylic polymer). In addition, the mass of the ultraviolet absorber represents the parts by mass of the active ingredient.

A cyan ink was obtained in the same manner as the yellow ink, except that the cyan pigment dispersion liquid was used in place of the yellow pigment dispersion liquid.

A black ink was obtained in the same manner as the yellow ink, except that the black pigment dispersion liquid was used in place of the yellow pigment dispersion liquid.

The obtained yellow ink, magenta ink, cyan ink, and black ink were combined to obtain ink set 1.

Ink sets 2 to 10 were obtained in the same manner as ink set 1, except that the amount of the ultraviolet absorber added to each of the yellow ink, magenta ink, cyan ink, and black ink was changed as shown in Table 1. In addition, the amount of the ultraviolet absorber added as shown in Table 1 represents the parts by mass of the active ingredient.

1-3. Absorbance Measurement

Each of the yellow ink, magenta ink, cyan ink, and black ink was diluted 4,000 times with pure water, and placed in a quartz glass cell with an optical path length of 10 mm. Then, using a spectrophotometer (U-3300, manufactured by Hitachi, Ltd.), the diluted ink was scanned from a wavelength of 340 nm to a wavelength of 800 nm at intervals of 5 nm or less, and the absorbance at a wavelength of 385 nm in the obtained absorption spectrum was measured. At this time, pure water was used as a reference.

1-4. Evaluation

Two independently driven piezo inkjet heads (manufactured by Konica Minolta, Inc. (360 dpi, ejection amount: 6 pL)) are disposed in such a way that the nozzles are staggered, thereby producing a head module for each color of yellow, magenta, cyan and black at 720 dpi×720 dpi. The inkjet heads were then installed on a stage conveyor so that the nozzle rows were perpendicular to the conveyance direction. The ink jet heads of the head modules for respective colors were filled with the corresponding inks constituting one of the obtained ink sets 1 to 8. An inkjet recording apparatus was thus configured in such a way that a solid image could be recorded by a single pass method on coated paper (OK Top Coat (+73.3 gsm), manufactured by Oji Paper Co., Ltd.) conveyed by a stage conveyor.

Solid ingle-color solid images of yellow, magenta, cyan, and black were formed by using the inkjet recording apparatus at an ejection amount of 10 mL/m². As a solid image of a secondary color, a blue solid image was formed by ejecting magenta and cyan inks at an ejection amount of 5 m/m². In a similar manner, a green solid image (formed by ejecting yellow and cyan inks at an ejection amount of 5 mL/m²) and a red solid image (formed by ejecting magenta and yellow inks at an ejection amount of 5 mL/m²) were formed.

Difference in Color Reproducibility

Yellow, magenta, cyan, red, blue, and green solid images obtained by using ink sets 1 to 10 were measured with a spectrodensitometer (X-Rite 938, manufactured by X-Rite Inc.) to measure hues $L^*a^*b^*$ of the solid images. This colorimetric measurement was performed under the conditions of a viewing angle of 2° and Status I to obtain each $L^*a^*b^*$ value for D65 illuminant and C illuminant. Color difference $\Delta ED_{65-A}$ was obtained from the following equation (A) from the $L^*a^*b^*$ values obtained for the illuminants, and evaluated according to the following evaluation criteria. An ink set with evaluation A or B was found qualified.

$$\Delta ED_{65-A}=[(L^*D_{65}-L^*A)^2+(a^*D_{65}-a^*A)^2+(b^*D_{65}-b^*A)^2]^{1/2} \quad \text{Equation(A)}$$

A: Color difference $\Delta ED_{65-A}$ is 1.0 or more and less than 2.5

B: Color difference $\Delta E_{D65-A}$ is 2.5 or more and less than 3.5

C: Color difference $\Delta E_{D65-A}$ is 3.5 or more and less than 4.0

D: Color difference $\Delta E_{D65-A}$ is 4.0 or more

Evaluation of Color Tone Balance

The solid images of single colors and secondary colors formed by the above method were left for 2,000 hours under the conditions of a black panel temperature of 63° C. and a humidity of 50% to be subjected to enforced degradation by using a sunshine weather meter (S80, manufactured by Suga Test Instruments Co., Ltd.).

A color patch of the prepared enforced degradation sample for each color was measured with a spectrodensitometer (X-Rite 938, manufactured by X-Rite Inc.). A graph of the color reproduction space was created by connecting the coordinate points of each image represented on the $a^*b^*$ CIE chromaticity coordinates. The graphs of the color reproduction space before and after the enforced degradation were compared, and the light resistance was evaluated according to the following criteria. An ink set with evaluation A or B was found qualified.

A: There is almost no balance change in the color reproduction space among the colors between the samples before and after the enforced degradation B: There is a slight balance change in the color reproduction space of the sample after the enforced degradation compared to the color reproduction space of the sample before the enforced degradation C: There is a balance change in the color reproduction space of the sample after the enforced degradation compared to the color reproduction space of the sample before the enforced degradation D: There is a significant balance change in the color reproduction space of the sample after the enforced degradation compared to the color reproduction space of the sample before the enforced degradation Regarding ink sets 1 to 10, Table 1 shows the mass of the ultraviolet absorber added to each of the inks constituting each ink set, the absorbance of each ink, and the evaluation results.

TABLE 1

| Ink set No. | Ultraviolet absorber | | | | Ink absorbance at wavelength of 385 nm | | | | | | | Values in absorbance equations Difference between maximum and minimum values | Evaluation Difference in color reproducibility | Color tone balance |
|---|---|---|---|---|---|---|---|---|---|---|---|---|---|---|
| | Yellow | Magenta | Cyan | Black | Abs(Y) | Abs(M) | Abs(C) | Abs(K) | R(Y, K) | R(M, K) | R(C, K) | | | |
| 1 | 0 | 1.2 | 0 | 0 | 0.663 | 0.395 | 0.425 | 0.875 | 0.758 | 0.452 | 0.485 | 0.306 | B | B |
| 2 | 0.2 | 3 | 3.1 | 1.1 | 0.707 | 0.792 | 1.108 | 1.117 | 0.663 | 0.709 | 0.992 | 0.359 | B | B |
| 3 | 0.9 | 3 | 2 | 0 | 0.862 | 0.792 | 0.866 | 0.875 | 0.985 | 0.905 | 0.989 | 0.084 | A | A |
| 4 | 0 | 1.5 | 0.5 | 0 | 0.663 | 0.461 | 0.535 | 0.875 | 0.758 | 0.527 | 0.611 | 0.231 | A | A |
| 5 | 0.2 | 2 | 1 | 0.1 | 0.707 | 0.572 | 0.645 | 0.897 | 0.789 | 0.637 | 0.719 | 0.152 | A | A |
| 6 | 0 | 0 | 0 | 0 | 0.663 | 0.131 | 0.425 | 0.875 | 0.758 | 0.149 | 0.485 | 0.609 | D | C |
| 7 | 0 | 0.3 | 0 | 0 | 0.663 | 0.197 | 0.425 | 0.875 | 0.758 | 0.225 | 0.485 | 0.533 | C | C |
| 8 | 0.9 | 0 | 0 | 0 | 0.862 | 0.131 | 0.425 | 0.875 | 0.985 | 0.149 | 0.485 | 0.836 | D | D |
| 9 | 0.2 | 2 | 2.6 | 0.1 | 0.707 | 0.572 | 0.998 | 0.897 | 0.789 | 0.637 | 1.113 | 0.475 | B | C |
| 10 | 0.2 | 3 | 3.1 | 0.1 | 0.707 | 0.792 | 1.108 | 0.897 | 0.789 | 0.883 | 1.236 | 0.447 | B | C |

Ink sets 1 to 5 showed better results than ink sets 6 to 10 in terms of the difference in color reproducibility and the evaluation of color tone balance. It is considered that by adjusting the absorbance ratios of the inks in each ink set to a substantially the same degree with respect to ultraviolet light, the absorbance of the inks on the short wavelength side of the visible light region can be set to approximately the same degree, thereby reducing the difference in color reproducibility. It is also considered that the degree of thermal decomposition of the colorant due to the absorption of ultraviolet light was adjusted to a substantially the same degree, thereby preventing deterioration of the color tone balance after the absorption of ultraviolet light. In particular, the difference between the maximum and minimum absorbance ratios is smaller in ink sets 3 to 5 than in other ink sets; therefore, it is considered that ink sets 3 to 5 showed better results in terms of the difference in color reproducibility and the evaluation of color tone balance.

On the other hand, in ink sets 6 to 8, the difference between the maximum and the minimum absorbance ratios was greater than 0.5; therefore, it is considered that the difference in color reproducibility was increased and evaluation of color tone balance was lowered. In ink sets 8 and 9, the difference in the absorbance ratio was 0.5 or less, but R (C, K) exceeded 1.0. Therefore, it is considered that ink sets 8 and 9 excessively absorbed ultraviolet light, and the thermal decomposition of the cyan colorant excessively occurred, thereby lowering the color tone balance.

The use of the ink set of the present invention can prevent deterioration of the color tone balance after storage, and reduce the difference in color reproducibility depending on whether or not the light source used for observing an image contains ultraviolet light. Therefore, the present invention is particularly advantageous, for example, for an image forming method using water based inks.

Although embodiments of the present invention have been described and illustrated in detail, the disclosed embodiments are made for purposes of illustration and example only and not limitation. The scope of the present invention should be interpreted by terms of the appended claims.

What is claimed is:

1. An ink set comprising:
four types of inks that are a yellow ink, a magenta ink, a cyan ink, and a black ink, wherein
each of the four types of inks contains water and a colorant,
at least one ink of the four types of inks contains an ultraviolet absorber, and
the four types of inks with R (Y, K), R (M, K), and R (C, K) satisfy condition (a) in which R (Y, K), R (M, K), and R (C, K) are all 0.2 or more and 1.0 or less and condition (b) in which a difference between maximum and minimum values of R (Y, K), R (M, K), and R (C, K) is 0.5 or less, wherein
R (Y, K), R (M, K), and R (C, K) are represented by Equations (1) to (3) below $$R(Y,K) = Abs(Y)/Abs(K) \qquad \text{Equation (1)}$$

$$R(M,K) = Abs(M)/Abs(K) \qquad \text{Equation (2) and}$$

$$R(C,K) = Abs(C)/Abs(K) \qquad \text{Equation (3),}$$

where Abs (Y) represents absorbance of the yellow ink with respect to light having a wavelength of 385 nm, Abs (M) represents absorbance of the magenta ink with respect to the light, Abs (C) represents absorbance of the cyan ink with respect to the light, and Abs (K) represents absorbance of the black ink with respect to the light.

2. The ink set according to claim 1, wherein:
the four types of inks satisfy condition (c) in which R (Y, K), R (M, K), and R (C, K) are all 0.5 or more and 0.8 or less.

3. The ink set according to claim 1, wherein:
the four types of inks satisfy condition (d) in which the difference between the maximum and minimum values of R (Y, K), R (M, K), and R (C, K) is 0.3 or less.

4. The ink set according to claim 1, wherein:
the yellow ink and the black ink satisfy condition (e) in which R (Y, K) is 0.5 or more and 1.0 or less.

5. The ink set according to claim 1, wherein:
the magenta ink and the black ink satisfy condition (f) in which R (M, K) is 0.4 or more and 1.0 or less.

6. The ink set according to claim 1, wherein:
the cyan ink and the black ink satisfy condition (g) in which R (C, K) is 0.4 or more and 1.0 or less.

7. The ink set according to claim 1, wherein:
the at least one ink containing the ultraviolet absorber contains 0.1 mass % or more and 3.0 mass % or less of the ultraviolet absorber with respect to total mass of the at least one ink.

8. The ink set according to claim 1, wherein:
the ultraviolet absorber contained in the at least one ink is contained in a resin particle.

9. The ink set according to claim 8, wherein:
the resin particle containing the ultraviolet absorber is at least one type of resin particle selected from the group consisting of acrylic resin particles, styrene resin particles, urethane resin particles, urethane-acrylic resin particles, and styrene-acrylic resin particles.

10. The ink set according to claim 1, wherein:
the four types of inks are all inkjet inks.

11. An image forming method using four types of inks that are a yellow ink, a magenta ink, a cyan ink, and a black ink, the method comprising:
applying one of the yellow ink, the magenta ink, and the cyan ink onto a surface of a recording medium; and
applying another one of the yellow ink, the magenta ink, and the cyan ink onto the surface of the recording medium, wherein
each of the four types of inks contains water and a colorant,
at least one ink of the four types of inks contains an ultraviolet absorber, and
the four types of inks with R (Y, K), R (M, K), and R (C, K) satisfy condition (a) in which R (Y, K), R (M, K), and R (C, K) are all 0.2 or more and 1.0 or less and condition (b) in which a difference between maximum and minimum values of R (Y, K), R (M, K), and R (C, K) is 0.5 or less, wherein
R (Y, K), R (M, K), and R (C, K) are represented by Equations (1) to (3) below $$R(Y,K) = \text{Abs}(Y)/\text{Abs}(K) \quad \text{Equation (1)}$$

$$R(M,K) = \text{Abs}(M)/\text{Abs}(K) \quad \text{Equation (2) and}$$

$$R(C,K) = \text{Abs}(C)/\text{Abs}(K) \quad \text{Equation (3), where}$$

Abs (Y) represents absorbance of the yellow ink with respect to light having a wavelength of 385 nm, Abs (M) represents absorbance of the magenta ink with respect to the light, Abs (C) represents absorbance of the cyan ink with respect to the light, and Abs (K) represents absorbance of the black ink with respect to the light.

12. The image forming method according to claim 11, wherein:
the inks applied onto the surface of the recording medium are applied by an inkjet method.

* * * * *